US008982182B2

(12) United States Patent
Shpunt et al.

(10) Patent No.: US 8,982,182 B2
(45) Date of Patent: Mar. 17, 2015

(54) NON-UNIFORM SPATIAL RESOURCE ALLOCATION FOR DEPTH MAPPING

(75) Inventors: Alexander Shpunt, Tel Aviv (IL); Zafrir Mor, Ein Habsor (IL)

(73) Assignee: Apple Inc., Cupertino, CA (US)

( * ) Notice: Subject to any disclaimer, the term of this patent is extended or adjusted under 35 U.S.C. 154(b) by 587 days.

(21) Appl. No.: 13/036,023

(22) Filed: Feb. 28, 2011

(65) Prior Publication Data

US 2011/0211044 A1 Sep. 1, 2011

Related U.S. Application Data

(60) Provisional application No. 61/309,000, filed on Mar. 1, 2010.

(51) Int. Cl.
| | | |
|---|---|---|
| *H04N 13/02* | (2006.01) | |
| *G06F 3/00* | (2006.01) | |
| *G06F 3/01* | (2006.01) | |
| *G06T 7/00* | (2006.01) | |

(52) U.S. Cl.
CPC ............ *H04N 13/0253* (2013.01); *G06F 3/005* (2013.01); *G06F 3/011* (2013.01); *G06T 7/0057* (2013.01); *G06T 2207/10016* (2013.01); *G06T 2207/30196* (2013.01)
USPC .......................................................... 348/42

(58) Field of Classification Search
None
See application file for complete search history.

(56) References Cited

U.S. PATENT DOCUMENTS

| | | | |
|---|---|---|---|
| 4,336,978 | A | 6/1982 | Suzuki |
| 4,542,376 | A | 9/1985 | Bass et al. |
| 4,802,759 | A | 2/1989 | Matsumoto |
| 4,843,568 | A | 6/1989 | Krueger et al. |
| 5,075,562 | A | 12/1991 | Greivenkamp et al. |
| 5,483,261 | A | 1/1996 | Yasutake |
| 5,630,043 | A | 5/1997 | Uhlin |
| 5,636,025 | A | 6/1997 | Bieman et al. |
| 5,712,682 | A | 1/1998 | Hannah |
| 5,835,218 | A | 11/1998 | Harding |
| 5,838,428 | A | 11/1998 | Pipitone et al. |
| 5,856,871 | A | 1/1999 | Cabib et al. |
| 5,909,312 | A | 6/1999 | Mendlovic et al. |
| 6,041,140 | A | 3/2000 | Binns et al. |

(Continued)

FOREIGN PATENT DOCUMENTS

| | | |
|---|---|---|
| DE | 19736169 A1 | 8/1997 |
| DE | 19638727 A1 | 3/1998 |

(Continued)

OTHER PUBLICATIONS

U.S. Appl. No. 12/522,171 Official Action dated Apr. 5, 2012.

(Continued)

*Primary Examiner* — Sath V Perungavoor
*Assistant Examiner* — Kehinde O Abimbola
(74) *Attorney, Agent, or Firm* — D. Kligler I.P. Services, Ltd.

(57) ABSTRACT

A method for depth mapping includes providing depth mapping resources including an illumination module, which is configured to project patterned optical radiation into a volume of interest containing the object, and an image capture module, which is configured to capture an image of the pattern reflected from the object. A depth map of the object is generated using the resources while applying at least one of the resources non-uniformly over the volume of interest.

21 Claims, 3 Drawing Sheets

(56) References Cited

U.S. PATENT DOCUMENTS

| | | | |
|---|---|---|---|
| 6,081,269 A | 6/2000 | Quarendon | |
| 6,084,712 A | 7/2000 | Harding | |
| 6,088,105 A | 7/2000 | Link | |
| 6,099,134 A | 8/2000 | Taniguchi et al. | |
| 6,100,517 A | 8/2000 | Yahav et al. | |
| 6,101,269 A | 8/2000 | Hunter et al. | |
| 6,108,036 A | 8/2000 | Harada et al. | |
| 6,167,151 A | 12/2000 | Albeck | |
| 6,259,561 B1 | 7/2001 | George et al. | |
| 6,262,740 B1 | 7/2001 | Lauer et al. | |
| 6,268,923 B1 | 7/2001 | Michniewicz et al. | |
| 6,301,059 B1 | 10/2001 | Huang et al. | |
| 6,377,700 B1 | 4/2002 | Mack et al. | |
| 6,438,263 B2 | 8/2002 | Albeck et al. | |
| 6,494,837 B2 | 12/2002 | Kim et al. | |
| 6,495,848 B1 | 12/2002 | Rubbert | |
| 6,686,921 B1 | 2/2004 | Rushmeier et al. | |
| 6,700,669 B1 | 3/2004 | Geng | |
| 6,731,391 B1 | 5/2004 | Kao et al. | |
| 6,741,251 B2 | 5/2004 | Malzbender | |
| 6,750,906 B1 | 6/2004 | Itani et al. | |
| 6,751,344 B1 | 6/2004 | Grumbine | |
| 6,754,370 B1 | 6/2004 | Hall-Holt et al. | |
| 6,759,646 B1 | 7/2004 | Acharya et al. | |
| 6,803,777 B2 | 10/2004 | Pfaff et al. | |
| 6,810,135 B1 | 10/2004 | Berenz et al. | |
| 6,813,440 B1 | 11/2004 | Yu et al. | |
| 6,825,985 B2 | 11/2004 | Brown et al. | |
| 6,841,780 B2 | 1/2005 | Cofer et al. | |
| 6,859,326 B2 | 2/2005 | Sales | |
| 6,937,348 B2 | 8/2005 | Geng | |
| 7,006,952 B1 | 2/2006 | Matsumoto et al. | |
| 7,009,742 B2 | 3/2006 | Brotherton-Ratcliffe et al. | |
| 7,013,040 B2 | 3/2006 | Shiratani | |
| 7,076,024 B2 | 7/2006 | Yokhin | |
| 7,112,774 B2 | 9/2006 | Baer | |
| 7,120,228 B2 | 10/2006 | Yokhin et al. | |
| 7,127,101 B2 | 10/2006 | Littlefield et al. | |
| 7,194,105 B2 | 3/2007 | Hersch et al. | |
| 7,231,069 B2 | 6/2007 | Nahata | |
| 7,256,899 B1 | 8/2007 | Faul et al. | |
| 7,335,898 B2 | 2/2008 | Donders et al. | |
| 7,369,685 B2 | 5/2008 | DeLean | |
| 7,385,708 B2 | 6/2008 | Ackerman et al. | |
| 7,433,024 B2 | 10/2008 | Garcia et al. | |
| 7,551,719 B2 | 6/2009 | Yokhin et al. | |
| 7,560,679 B1 | 7/2009 | Gutierrez | |
| 7,659,995 B2 | 2/2010 | Knighton et al. | |
| 7,700,904 B2 | 4/2010 | Toyoda et al. | |
| 7,751,063 B2 | 7/2010 | Dillon et al. | |
| 7,811,825 B2 | 10/2010 | Fauver et al. | |
| 7,840,031 B2 | 11/2010 | Albertson et al. | |
| 7,952,781 B2 | 5/2011 | Weiss et al. | |
| 8,018,579 B1 | 9/2011 | Krah | |
| 8,035,806 B2 | 10/2011 | Jin et al. | |
| 8,126,261 B2 | 2/2012 | Medioni et al. | |
| 8,326,025 B2 | 12/2012 | Boughorbel | |
| 8,369,607 B2 * | 2/2013 | Mashitani et al. | 382/154 |
| 2001/0016063 A1 | 8/2001 | Albeck et al. | |
| 2002/0041327 A1 | 4/2002 | Hildreth et al. | |
| 2002/0075456 A1 | 6/2002 | Shiratani | |
| 2003/0048237 A1 | 3/2003 | Sato et al. | |
| 2003/0057972 A1 | 3/2003 | Pfaff et al. | |
| 2003/0156756 A1 | 8/2003 | Gokturk et al. | |
| 2004/0001145 A1 | 1/2004 | Abbate | |
| 2004/0063235 A1 | 4/2004 | Chang | |
| 2004/0105580 A1 | 6/2004 | Hager et al. | |
| 2004/0130730 A1 | 7/2004 | Cantin et al. | |
| 2004/0130790 A1 | 7/2004 | Sales | |
| 2004/0174770 A1 | 9/2004 | Rees | |
| 2004/0213463 A1 | 10/2004 | Morrison | |
| 2004/0218262 A1 | 11/2004 | Chuang et al. | |
| 2004/0228519 A1 | 11/2004 | Littlefield et al. | |
| 2004/0264764 A1 | 12/2004 | Kochi et al. | |
| 2005/0018209 A1 | 1/2005 | Lemelin et al. | |
| 2005/0052637 A1 | 3/2005 | Shaw et al. | |
| 2005/0089212 A1* | 4/2005 | Mashitani et al. | 382/154 |
| 2005/0111705 A1 | 5/2005 | Waupotitsch et al. | |
| 2005/0134582 A1* | 6/2005 | Claus et al. | 345/419 |
| 2005/0135555 A1* | 6/2005 | Claus et al. | 378/19 |
| 2005/0135557 A1* | 6/2005 | Claus et al. | 378/21 |
| 2005/0200838 A1 | 9/2005 | Shaw et al. | |
| 2005/0200925 A1 | 9/2005 | Brotherton-Ratcliffe et al. | |
| 2005/0231465 A1 | 10/2005 | DePue et al. | |
| 2005/0271279 A1 | 12/2005 | Fujimura et al. | |
| 2006/0017656 A1 | 1/2006 | Miyahara | |
| 2006/0072851 A1 | 4/2006 | Kang et al. | |
| 2006/0156756 A1 | 7/2006 | Becke | |
| 2006/0221218 A1 | 10/2006 | Adler et al. | |
| 2006/0221250 A1 | 10/2006 | Rossbach et al. | |
| 2006/0269896 A1 | 11/2006 | Liu et al. | |
| 2007/0057946 A1 | 3/2007 | Albeck et al. | |
| 2007/0060336 A1 | 3/2007 | Marks et al. | |
| 2007/0133840 A1 | 6/2007 | Cilia | |
| 2007/0165243 A1 | 7/2007 | Kang et al. | |
| 2007/0262985 A1 | 11/2007 | Watanble et al. | |
| 2008/0018595 A1 | 1/2008 | Hildreth et al. | |
| 2008/0031513 A1 | 2/2008 | Hart | |
| 2008/0037829 A1* | 2/2008 | Givon | 382/107 |
| 2008/0106746 A1* | 5/2008 | Shpunt et al. | 356/610 |
| 2008/0118143 A1 | 5/2008 | Gordon et al. | |
| 2008/0198355 A1 | 8/2008 | Domenicali et al. | |
| 2008/0212835 A1 | 9/2008 | Tavor | |
| 2008/0240502 A1* | 10/2008 | Freedman et al. | 382/103 |
| 2008/0247670 A1 | 10/2008 | Tam et al. | |
| 2008/0278572 A1 | 11/2008 | Gharib et al. | |
| 2008/0285827 A1 | 11/2008 | Meyer et al. | |
| 2009/0016642 A1 | 1/2009 | Hart | |
| 2009/0046152 A1* | 2/2009 | Aman | 348/157 |
| 2009/0060307 A1 | 3/2009 | Ghanem et al. | |
| 2009/0096783 A1* | 4/2009 | Shpunt et al. | 345/419 |
| 2009/0183125 A1 | 7/2009 | Magal et al. | |
| 2009/0183152 A1 | 7/2009 | Yang et al. | |
| 2009/0185274 A1* | 7/2009 | Shpunt | 359/558 |
| 2009/0226079 A1 | 9/2009 | Katz et al. | |
| 2009/0244309 A1 | 10/2009 | Maison et al. | |
| 2010/0007717 A1 | 1/2010 | Spektor et al. | |
| 2010/0013860 A1 | 1/2010 | Mandella et al. | |
| 2010/0020078 A1 | 1/2010 | Shpunt | |
| 2010/0118123 A1 | 5/2010 | Freedman et al. | |
| 2010/0128221 A1 | 5/2010 | Muller et al. | |
| 2010/0142014 A1 | 6/2010 | Rosen et al. | |
| 2010/0177164 A1 | 7/2010 | Zalevsky et al. | |
| 2010/0182406 A1 | 7/2010 | Benitez | |
| 2010/0188484 A1* | 7/2010 | Park et al. | 348/46 |
| 2010/0194745 A1 | 8/2010 | Leister et al. | |
| 2010/0201811 A1 | 8/2010 | Garcia et al. | |
| 2010/0225746 A1 | 9/2010 | Shpunt et al. | |
| 2010/0243899 A1 | 9/2010 | Ovsiannikov et al. | |
| 2010/0245826 A1 | 9/2010 | Lee | |
| 2010/0265316 A1 | 10/2010 | Sali et al. | |
| 2010/0278384 A1 | 11/2010 | Shotton et al. | |
| 2010/0284082 A1* | 11/2010 | Shpunt et al. | 359/558 |
| 2010/0290698 A1 | 11/2010 | Shpunt et al. | |
| 2010/0303289 A1 | 12/2010 | Polzin et al. | |
| 2011/0001799 A1 | 1/2011 | Rothenberger et al. | |
| 2011/0025827 A1 | 2/2011 | Shpunt et al. | |
| 2011/0043403 A1 | 2/2011 | Loffler | |
| 2011/0074932 A1 | 3/2011 | Gharib et al. | |
| 2011/0096182 A1 | 4/2011 | Cohen et al. | |
| 2011/0134114 A1 | 6/2011 | Rais et al. | |
| 2011/0158508 A1 | 6/2011 | Shpunt et al. | |
| 2011/0187878 A1 | 8/2011 | Mor et al. | |
| 2011/0188054 A1 | 8/2011 | Mor et al. | |
| 2011/0279648 A1 | 11/2011 | Lutian et al. | |
| 2011/0285910 A1 | 11/2011 | Bamji et al. | |
| 2011/0310125 A1 | 12/2011 | McEldowney et al. | |
| 2012/0012899 A1 | 1/2012 | Jin et al. | |
| 2012/0051588 A1 | 3/2012 | McEldowney | |

FOREIGN PATENT DOCUMENTS

| | | | |
|---|---|---|---|
| GB | 2352901 A | | 2/2001 |
| JP | 62206684 A | | 9/1987 |

(56) References Cited

FOREIGN PATENT DOCUMENTS

| | | |
|---|---|---|
| JP | 01-240863 | 9/1989 |
| JP | 03-029806 U | 2/1991 |
| JP | H03-040591 A | 2/1991 |
| JP | 06-273432 | 9/1994 |
| JP | H08-186845 A | 7/1996 |
| JP | H10-327433 A | 12/1998 |
| JP | 2000131040 A | 5/2000 |
| JP | 2001141430 A | 5/2001 |
| JP | 2002122417 A | 4/2002 |
| JP | 2002-152776 A | 5/2002 |
| JP | 2002-213931 A | 7/2002 |
| JP | 2002-365023 A | 12/2002 |
| JP | 2006-128818 A | 5/2006 |
| WO | 9303579 A1 | 2/1993 |
| WO | 9827514 A2 | 6/1998 |
| WO | 9828593 A1 | 7/1998 |
| WO | 9828593 A2 | 7/1998 |
| WO | 2005010825 A2 | 2/2005 |

OTHER PUBLICATIONS

U.S. Appl. No. 12/397,362 Official Action dated Apr. 24, 2012.
International Application PCT/IB2011/053560 Search Report dated Jan. 19, 2012.
International Application PCT/IB2011/055155 Search Report dated Apr. 20, 2012.
U.S. Appl. No. 13/311,589 filed Dec. 6, 2011.
U.S. Appl. No. 13/437,977 filed Apr. 3, 2012.
U.S. Appl. No. 61/598,921 filed Feb. 15, 2012.
Richardson, W. H., "Bayesian-Based Iterative Method of Image Restoration", Journal of the Optical Society of America, vol. 62, No. 1, pp. 55-59, Jan. 1972.
Omnivision Technologies Inc., "OV2710 1080p/720p HD Color CMOS Image Sensor with OmniPixel3-HS Technology", Dec. 2011.
Hart, D., U.S. Appl. No. 09/616,606 "Method and System for High Resolution , Ultra Fast 3-D Imaging" filed on Jul. 14, 2000.
International Application PCT/IL2007/000306 Search Report dated Oct. 2, 2008.
International Application PCT/IL20027/000262 Search Report dated Oct. 16, 2008.
International Application PCT/IL2008/000458 Search Report dated Oct. 28, 2008.
International Application PCT/IL2008/000327 Search Report dated Sep. 26, 2008.
International Application PCT/IL2006/000335 Preliminary Report on Patentability dated Apr. 24, 2008.
Sazbon et al., "Qualitative real-time range extraction for preplanned scene partitioning using laser beam coding", Pattern Recognition Letters 26, pp. 1772-1781, year 2005.
Sjodahl et al., "Measurement of shape by using projected random and patterns and temporal digital speckle photography", Applied Optics, vol. 38, No. 10, Apr. 1, 1999.
Garcia et al., "Three dimensional mapping and range measurement by means of projected speckle patterns", Applied Optics, vol. 47, No. 16, Jun. 1, 2008.
Chen et al., "Measuring of a Three-Dimensional Surface by Use of a Spatial Distance Computation", Applied Optics, vol. 42, issue 11, pp. 1958-1972, Apr. 10, 2003.
Ypsilos et al., "Speech-driven Face Synthesis from 3D Video", 2nd International Symposium on 3D Processing, Visualization and Transmission, Thessaloniki, Greece, Sep. 6-9, 2004.
Hanson et al., "Optics and Fluid Dynamics Department", Annual Progress Report for 1997 (an abstract).
Ypsilos et al., "Video-rate capture of Dynamic Face Shape and Appearance", Sixth IEEE International Conference on Automatic Face and Gesture Recognition (FGR 2004), Seoul, Korea, May 17-19, 2004.
Goodman, J.W., "Statistical Properties of Laser Speckle Patterns", Laser Speckle and Related Phenomena, pp. 9-75, Springer-Verlag, Berlin Heidelberg, 1975.
Dainty, J.C., "Introduction", Laser Speckle and Related Phenomena, pp. 1-7, Springer-Verlag, Berlin Heidelberg, 1975.
Avidan et al., "Trajectory triangulation: 3D reconstruction of moving points from amonocular image sequence", IEEE Transactions on Pattern Analysis and Machine Intelligence, vol. 22, No. 4, pages, Apr. 2000.
Leclerc et al., "The direct computation of height from shading", Proceedings of Computer Vision and Pattern Recognition, pp. 552-558, year 1991.
Zhang et al., "Height recovery from intensity gradients", Proceedings of IEEE Computer Society Conference on Computer Vision and Pattern Recognition, pp. 508-513, year 1994.
Zigelman et al., "Texture mapping using surface flattening via multidimensional scaling", IEEE Transactions on Visualization and Computer Graphics, 8 (2), pp. 198-207, year 2002.
Kimmel et al., Analyzing and synthesizing images by evolving curves with the Osher-Sethian method, International Journal of Computer Vision, 24(1), pp. 37-56 , year 1997.
Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.
Horn, B., "Height and gradient from shading", International Journal of Computer Vision, No. 5, pp. 37-76, year 1990.
Bruckstein, A., "On shape from shading", Computer Vision, Graphics, and Image Processing, vol. 44, pp. 139-154, year 1988.
Zhang et al., "Rapid Shape Acquisition Using Color Structured Light and Multi-Pass Dynamic Programming", 1st International Symposium on 3D Data Processing Visualization and Transmission (3DPVT), Padova, Italy, Jul. 2002.
Besl, P., "Active Optical Range Imaging Sensors", Machine Vision and Applications, No. 1, pp. 127-152, USA 1988.
Horn et al., "Toward optimal structured light patterns", Proceedings of International Conference on Recent Advances in 3D Digital Imaging and Modeling, pp. 28-37, Ottawa, Canada, May 1997.
Mendlovic, et al., "Composite harmonic filters for scale, projection and shift invariant pattern recognition", Applied Optics, vol. 34, No. 2, pp. 310-316, Jan. 10, 1995.
Asada et al., "Determining Surface Orientation by Projecting a Stripe Pattern", IEEE Transactions on Pattern Analysis and Machine Intelligence, vol. 10, No. 5, year 1988.
Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.
EZconn Czech A.S., "Site Presentation", Oct. 2009.
Zhu et al., "Fusion of Time-of-Flight Depth and Stereo for High Accuracy Depth Maps", Proceedings of the IEEE Conference on Computer Vision and Pattern Recognition, Anchorage, USA, Jun. 24-26, 2008.
Luxtera Inc., "Luxtera Announces World's First 10GBit CMOS Photonics Platform", Carlsbad, USA, Mar. 28, 2005 (press release).
Lee et al., "Variable Pulse Mode Driving IR Source Based 3D Robotic Camera", MVA2005 IAPR Conference on Machine Vision Applications, pp. 530-533, Japan, May 16-18, 2005.
Mordohai et al., "Tensor Voting: A Perceptual Organization Approach to Computer Vision and Machine Learning", Synthesis Lectures on Image, Video and Multimedia Processing, issue No. 8, Publishers Morgan and Claypool, year 2006.
Beraldin et al., "Active 3D Sensing", Scuola Normale Superiore Pisa, vol. 10, pp. 22-46, Apr. 2000.
Bhat et al., "Ordinal Measures for Image Correspondence", IEEE Transactions on Pattern Analysis and Machine Intelligence, vol. 20, No. 4, pp. 415-423, Apr. 1998.
Bradley et al., "Synchronization and Rolling Shutter Compensation for Consumer Video Camera Arrays", IEEE International Workshop on Projector-Camera Systems—PROCAMS 2009 (Miami Beach, Florida, 2009).
De Piero et al., "3D Computer Vision Using Structured Light: Design Calibration and Implementation Issues", Advances in Computers, vol. 43, pp. 243-278, Academic Press 1996.
Hongjun et al., "Shape Measurement by Digital Speckle Temporal Sequence Correlation Method", Acta Optica Sinica Journal, vol. 21, No. 10, pp. 1208-1213, Oct. 2001 (with English abstract).

(56) References Cited

OTHER PUBLICATIONS

Hongjun, D., "Digital Speckle Temporal Sequence Correlation Method and the Application in Three-Dimensional Shape Measurement", Chinese Doctoral Dissertations & Master's Theses, Full-text Database (Master) Basic Sciences, No. 1, Mar. 15, 2004.
Hsueh et al., "Real-time 3D Topography by Speckle Image Correlation", Proceedings of SPIE Conference on Input/Output and Imaging Technologies, vol. 3422, pp. 108-112, Taiwan, Jul. 1998.
Chinese Patent Application # 200780009053.8 Official Action dated Apr. 15, 2010 (English translation).
Chinese Patent Application # 200680038004.2 Official Action dated Mar. 30, 2010 (English translation).
Chinese Patent Application # 200680038004.2 Official Action dated Aug. 3, 2011 (English translation).
Engfield, N., "Use of Pseudorandom Encoded Grid in U.S. Appl. No. 11/899,542", Andrews Robichaud, Jun. 22, 2011.
U.S. Appl. No. 61/471,215 filed on Apr. 4, 2011.
Abramson, N., "Holographic Contouring by Translation", Applied Optics Journal, vol. 15, No. 4, pp. 1018-1976, Apr. 1976.
Achan et al., "Phase Unwrapping by Minimizing Kikuchi Free Energy", IEEE International Geoscience and Remote Sensing Symposium, pp. 1738-1740, Toronto, Canada, Jun. 2002.
Theocaris et al., "Radial Gratings as Moire Gauges", Journal of Scientific Instruments (Journal of Physics E), series 2, vol. 1, year 1968.
International Application PCT/IB2011/053560 "Scanning Projectors and Image Capture Modules for 3D Mapping" filed on Aug. 10, 2011.
International Application PCT/IL2009/000285 Search Report dated Jun. 11, 2009.
Brooks et al., "Moire Gauging Using Optical Interference Patterns", Applied Optics Journal, vol. 8, No. 5, pp. 935-940, May 1969.
Hovanesian et al., "Moire Contour-Sum Contour-Difference, and Vibration Analysis of Arbitrary Objects", Applied Optics Journal, vol. 10, No. 12, pp. 2734-2738, Dec. 1971.
Bryngdahl, O., "Characteristics of Superposed Patterns in Optics", Journal of Optical Society of America, vol. 66, No. 2, pp. 87-94, Feb. 1976.
International Application PCT/IL2008/000095 Search Report dated Jul. 24, 2008.
Chen et al., "Overview of Three-Dimensional Shape Measurement Using Optical Methods", Society of Photo-Optical Instrumentation Engineers Journal 39(1), pp. 10-22, Jan. 2000.
Cohen et al., "High-Resolution X-ray Diffraction for Characterization and Monitoring of Silicon-On-Insulator Fabrication Processes", Applied Physics Journal, vol. 93, No. 1, pp. 245-250, Jan. 2003.
Zhang et al., "Shape from intensity gradient", IEEE Transactions on Systems, Man and Cybernetics—Part A: Systems and Humans, vol. 29, No. 3, pp. 318-325, May 1999.
Doty, J.L., "Projection Moire for Remote Contour Analysis", Journal of Optical Society of America, vol. 73, No. 3, pp. 366-372, Mar. 1983.
Ben Eliezer et al., "Experimental Realization of an Imaging System with an Extended Depth of Field", Applied Optics Journal, vol. 44, No. 14, pp. 2792-2798, May 10, 2005.
Tay et al., "Grating Projection System for Surface Contour Measurement", Applied Optics Journal, vol. 44, No. 8, pp. 1393-1400, Mar. 10, 2005.
Takeda et al., "Fourier Transform Methods of Fringe-Pattern Analysis for Computer-Based Topography and Interferometry", Journal of Optical Society of America, vol. 72, No. 1, Jan. 1982.
Takasaki, H., "Moire Topography", Applied Optics Journal, vol. 12, No. 4, pp. 845-850, Apr. 1973.
Takasaki, H., "Moire Topography", Applied Optics Journal, vol. 9, No. 6, pp. 1467-1472, Jun. 1970.
Hildebrand et al., "Multiple-Wavelength and Multiple-Source Holography Applied to Contour Generation", Journal of Optical Society of America Journal, vol. 57, No. 2, pp. 155-162, Feb. 1967.
Su et al., "Application of Modulation Measurement Profilometry to Objects with Surface Holes", Applied Optics Journal, vol. 38, No. 7, pp. 1153-1158, Mar. 1, 1999.

Btendo, "Two Uni-axial Scanning Mirrors Vs One Bi-axial Scanning Mirror", Kfar Saba, Israel, Aug. 13, 2008.
Hung et al., "Time-Averaged Shadow-Moire Method for Studying Vibrations", Applied Optics Journal, vol. 16, No. 6, pp. 1717-1719, Jun. 1977.
Idesawa et al., "Scanning Moire Method and Automatic Measurement of 3-D Shapes", Applied Optics Journal, vol. 16, No. 8, pp. 2152-2162, Aug. 1977.
Iizuka, K., "Divergence-Ratio Axi-Vision Camera (Divcam): A Distance Mapping Camera", Review of Scientific Instruments 77, 0451111 (2006).
Lim et al., "Additive Type Moire with Computer Image Processing", Applied Optics Journal, vol. 28, No. 13, pp. 2677-2680, Jul. 1, 1989.
Piestun et al., "Wave Fields in Three Dimensions: Analysis and Synthesis", Journal of the Optical Society of America, vol. 13, No. 9, pp. 1837-1848, Sep. 1996.
Post et al., "Moire Methods for Engineering and Science—Moire Interferometry and Shadow Moire", Photomechanics (Topics in Applied Physics), vol. 77, pp. 151-196, Springer Berlin / Heidelberg, Jan. 1, 2000.
Chinese Patent Application # 200780006560.6 Official Action dated Oct. 11, 2010.
International Application PCT/IB2010/053430 Search Report dated Dec. 28, 2010.
Scharstein et al., "High-Accuracy Stereo Depth Maps Using Structured Light", IEEE Proceedings of the Conference on Computer Vision and Pattern Recognition, pp. 165-171, Jun. 18, 2003.
Koschan et al., "Dense Depth Maps by Active Color Illumination and Image Pyramids", Advances in Computer Vision, pp. 137-148, Springer 1997.
Marcia et al., "Fast Disambiguation of Superimposed Images for Increased Field of View", IEEE International Conference on Image Processing, San Diego, USA, Oct. 12-15, 2008.
Microvision Inc., "Micro-Electro-Mechanical System (MEMS) Scanning Mirror", years 1996-2009.
U.S. Appl. No. 61/419,891 "Lens Arrays for Pattern Projection and Imaging" filed on Dec. 6, 2010.
U.S. Appl. No. 61/415,352 "Depth mapping using time-coded illumination" filed on Nov. 19, 2010.
Lavoie et al., "3-D Object Model Recovery From 2-D Images Using Structured Light", IEEE Transactions on Instrumentation and Measurement, vol. 53, No. 2, pp. 437-443, Apr. 2004.
Chinese Application # 200780016625.5 Office Action dated May 12, 2011.
U.S. Appl. No. 11/899,542 Office Action dated Apr. 4, 2011.
U.S. Appl. No. 11/724,068 Office Action dated Mar. 1, 2011.
Chinese Application # 200780009053.8 Office Action dated Mar. 10, 2011.
Japanese Application # 2008535179 Office Action dated Apr. 1, 2011.
Kun et al., "Gaussian Laser Beam Spatial Distribution Measurement by Speckles Displacement Method", HICH Power Laser and Particle Beams, vol. 12, No. 2, Apr. 2000.
Chinese Patent Application # 200680038004.2 Official Action dated Dec. 24, 2010.
Chinese Patent Application # 200780016625.5 Official Action dated Oct. 26, 2010.
Chinese Patent Application # 200780006560.6 Official Action dated Feb. 1, 2011.
International Application No. PCT/IB2010/053430 Search Report dated Dec. 28, 2010.
Yao Kun et al., "Measurement of Space Distribution of Laser Gaussian Beam by Speckles Displacement Method", High Power Laser and Particle Beams, vol. 12, No. 2, pp. 141-144, Apr. 30, 2000.
Japanese Patent Application # 2011-517308 Office Action dated Jun. 19, 2013.
International Application PCT/IB2013/051189 Search Report dated Jun. 18, 2013.
U.S. Appl. No. 12/707,678 Office Action dated Jun. 20, 2013.
U.S. Appl. No. 13/541,775 filed on Jul. 5, 2012.
U.S. Appl. No. 12/282,517 Official Action dated Jun. 12, 2012.
U.S. Appl. No. 12/522,172 Official Action dated Jun. 29, 2012.
U.S. Appl. No. 12/703,794 Official Action dated Aug. 7, 2012.

(56) References Cited

OTHER PUBLICATIONS

U.S. Appl. No. 12/522,176 Official Action dated Aug. 2, 2012.
JP Patent Application # 2008558984 Office Action dated Jul. 3, 2012.
U.S. Appl. No. 12/844,864 Office Action dated Sep. 26, 2013.
U.S. Appl. No. 13/921,224 Office Action dated Oct. 3, 2013.
U.S. Appl. No. 12/958,427 Office Action dated Nov. 22, 2013.
Korean Patent Application # 10-2008-7025030 Office Action dated Feb. 25, 2013.
U.S. Appl. No. 12/707,678 Office Action dated Feb. 26, 2013.
U.S. Appl. No. 12/758,047 Office Action dated Apr. 25, 2013.
U.S. Appl. No. 12/844,864 Office Action dated Apr. 11, 2013.
Japanese Patent Application # 2011-517308 Official Action dated Dec. 5, 2012.
U.S. Appl. No. 12/844,864 Official Action dated Dec. 6, 2012.
U.S. Appl. No. 12/758,047 Official Action dated Oct. 25, 2012.
Japanese Patent Application # 2008558981 Official Action dated Nov. 2, 2011.
U.S. Appl. No. 12/522,171 Official Action dated Dec. 22, 2011.
U.S. Appl. No. 12/522,172 Official Action dated Nov. 30, 2011.
Japanese Patent Application # 2008558984 Official Action dated Nov. 1, 2011.
U.S. Appl. No. 13/043,488 Official Action dated Jan. 3, 2012.
Japanese Patent Application # 2008535179 Official Action dated Nov. 8, 2011.
Chinese Patent Application # 2006800038004.2 Official Action dated Nov. 24, 2011.
Marcia et al., "Superimposed Video Disambiguation for Increased Field of View", Optics Express 16:21, pp. 16352-16363, year 2008.
Guan et al., "Composite Structured Light Pattern for Three Dimensional Video", Optics Express 11:5, pp. 406-417, year 2008.
U.S. Appl. No. 13/311,584 filed on Dec. 6, 2011.
PCT Application PCT/IB2011/055155 filed on Nov. 17, 2011.

\* cited by examiner

NON-UNIFORM SPATIAL RESOURCE ALLOCATION FOR DEPTH MAPPING

CROSS-REFERENCE TO RELATED APPLICATION

This application claims the benefit of U.S. Provisional Patent Application 61/309,000, filed Mar. 1, 2010, which is incorporated herein by reference.

FIELD OF THE INVENTION

The present invention relates generally to methods and systems for depth mapping, and specifically to optimizing the design and performance of a depth mapping system.

BACKGROUND OF THE INVENTION

A number of different methods and systems are known in the art for creating depth maps. In the present patent application and in the claims, the terms "depth map" and "3D map" are used interchangeably to refer to a representation of a scene as a two-dimensional matrix of pixels, in which each pixel corresponds to a respective location in the scene and has a respective pixel value indicative of the distance from a certain reference location to the respective scene location. In other words, the depth map has the form of an image in which the pixel values indicate topographical information, rather than brightness and/or color of the objects in the scene.

Depth maps may be created, for example, by detection and processing of an image of an object onto which a pattern is projected, such as a laser speckle pattern as described in PCT international Publication WO 2007/043036 A1, whose disclosure is incorporated herein reference. As another example, U.S. Patent Application Publication 2008/0240502, whose disclosure is incorporated herein by reference, describes apparatus for mapping an object using an illumination assembly, which includes a transparency containing a fixed pattern of spots and projects the pattern onto an object. An image capture assembly captures an image of the pattern that is projected onto the object. A processor processes the image captured by the image capture assembly so as to reconstruct a 3D map of the object.

SUMMARY

Depth mapping systems in practice (in common with imaging systems generally) have limited resources, in terms of light intensity, optical resolution and computing power, for example. Embodiments of the present invention that are described hereinbelow provide techniques that may be used to optimally allocate these resources in order to improve overall system performance.

There is therefore provided, in accordance with an embodiment of the present invention, a method for depth mapping, which includes providing depth mapping resources including an illumination module, which is configured to project patterned optical radiation into a volume of interest containing the object, and an image capture module, which is configured to capture an image of the pattern reflected from the object. A depth map of the object is generated using the resources while applying at least one of the resources non-uniformly over the volume of interest.

In some embodiments, the volume of interest has a depth that varies with angle relative to the illumination and image capture modules, and applying the at least one of the resources non-uniformly includes varying an application of the at least one of the resources responsively to the varying depth as a function of the angle. In a disclosed embodiment, the volume of interest has a pentagonal profile, with a vertex at the image capture module. Varying the application of the at least one of the resources non-uniformly may include angularly modulating an intensity distribution of the patterned optical radiation projected by the illumination module. Additionally or alternatively, varying the application of the at least one of the resources non-uniformly may include optically distorting the image captured by the image capture module.

In disclosed embodiments, the illumination module is configured to project a spatial pattern of the optical radiation onto the object, and generating the depth map includes deriving depth coordinates of the object based on transverse shifts of the spatial pattern in the image.

There is also provided, in accordance with an embodiment of the present invention, apparatus for depth mapping, which includes depth mapping resources including an illumination module, which is configured to project patterned optical radiation into a volume of interest containing the object, and an image capture module, which is configured to capture an image of the pattern reflected from the object. At least one of the resources is applied non-uniformly over the volume of interest. A processor is configured to process the image in order to generate a depth map of the object.

There is additionally provided, in accordance with an embodiment of the present invention, apparatus for depth mapping, including an illumination module, which is configured to project patterned optical radiation, with a given pattern distortion, into a volume of interest containing an object. An image capture module includes an image sensor and objective optics configured to form an image of the pattern on an image sensor while applying an optical distortion to the image that compensates at least partially for the pattern distortion. A processor is configured to process the image in order to generate a depth map of the object.

In a disclosed embodiment, the objective optics include an F-theta lens, and the illumination module includes a diffractive optical element (DOE) and a radiation emitter configured to transilluminate the DOE so as to generate the patterned optical radiation.

The present invention will be more fully understood from the following detailed description of the embodiments thereof, taken together with the drawings in which:

DETAILED DESCRIPTION OF EMBODIMENTS

In creating a depth mapping system, the designer typically attempts to optimize the 3D resolution of the system, including both the effective number of pixels in the map and the number of depth gradations. The resolution is limited, however, by the available resources, including the resolution and signal/noise ratio of the image capture module and, in active depth mapping systems, the power and pattern definition of the illumination module. (The term "active" is used in the context of the present patent application to refer to depth mapping techniques in which a pattern of optical radiation is projected onto an object and an image of the patterned radiation reflected from the object is captured by an imaging device. The pattern may be a spatial pattern, as in patterned illumination imaging systems, or a temporal pattern, as in time-of-flight imaging systems, or it may contain a combination of spatial and temporal patterns.)

Embodiments of the present invention that are described hereinbelow provide methods that may be used to optimize the performance of a depth mapping system by applying the resources of the system non-uniformly over the volume of interest that is mapped by the system. Some of these embodiments are based on the realization that the depth of the volume of interest varies with angle relative to the illumination and image capture modules. Thus, system performance may be optimized, relative to the available resources, by varying aspects of the illumination pattern or the optical resolution, or both, as a function of the angle, responsively to the varying depth.

Figure 1:
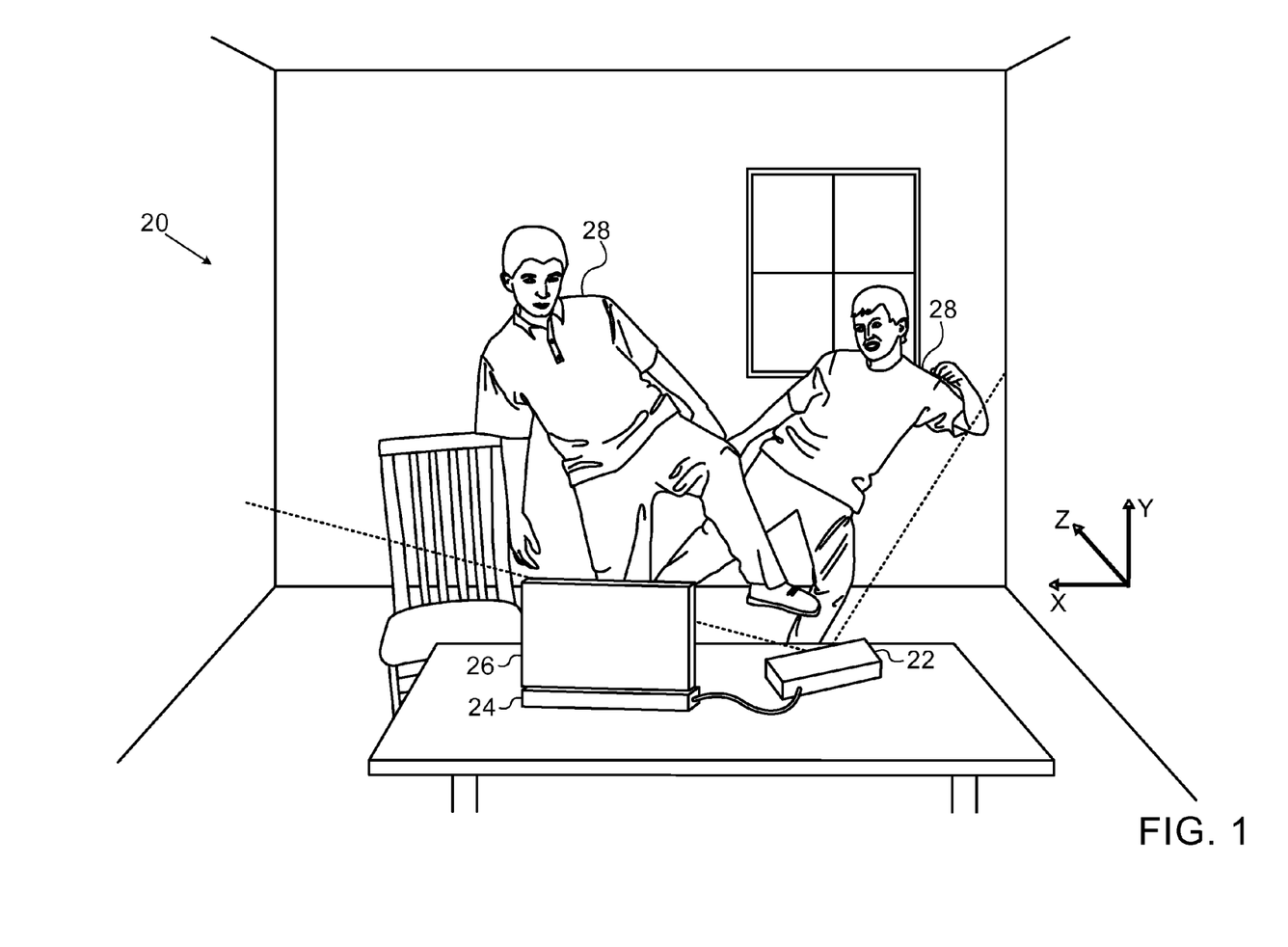
FIG. 1 is a schematic, pictorial illustration of a depth mapping system, in accordance with an embodiment of the present invention.

FIG. 1 is a schematic, pictorial illustration of a depth mapping system 20, in accordance with an embodiment of the present invention. The system is based on a 3D imaging assembly 22, which captures 3D scene information in a volume of interest (VOI) that includes one or more objects. In this example, the objects comprise at least a part of the bodies of users 28. Assembly 22 outputs a sequence of frames containing depth data to a computer 24, which processes and extracts high-level information from the map data. This high-level information may be provided, for example, to an application running on computer 24, which drives a display screen 26 accordingly.

Computer 24 processes data generated by assembly 22 in order to reconstruct a depth map of the VOI containing users 28. In one embodiment, assembly 22 projects a pattern of spots onto the scene and captures an image of the projected pattern. Assembly 22 or computer 24 then computes the 3D coordinates of points in the scene (including points on the surface of the users' bodies) by triangulation, based on transverse shifts of the spots in the captured image relative to a reference image. This approach is advantageous in that it does not require the user to hold or wear any sort of beacon, sensor, or other marker. It gives the depth coordinates of points in the scene relative to a predetermined reference plane, at a certain distance from assembly 22. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, system 20 may use other methods of 3D mapping, based on single or multiple cameras or other types of sensors, such as time-of-flight cameras, as are known in the art.

Although computer 24 is shown in FIG. 1, by way of example, as a separate unit from imaging assembly 22, some or all of the processing functions of the computer may be performed by a suitable microprocessor and software or by dedicated circuitry within the housing of the imaging assembly or otherwise associated with the imaging assembly. As another alternative, at least some of these processing functions may be carried out by a suitable processor that is integrated with display screen (in a television set, for example) or with any other suitable sort of computerized device, such as a game console or media player. The sensing functions of assembly 22 may likewise be integrated into computer 24 or other computerized apparatus that is to be controlled by the sensor output.

For simplicity and clarity in the description that follows, a set of Cartesian axes is marked in FIG. 1. The Z-axis is taken to be the optical axis of imaging assembly 22 (and specifically of an image capture module in the assembly, as described below). The frontal plane of the imaging assembly is taken to be the X-Y plane, with the X-axis as the horizontal and the origin at the entrance pupil of the image capture module. These axes, however, are defined solely for the sake of convenience. Other geometrical configurations of the imaging assembly and its volume of interest may alternatively be used and are considered to be within the scope of the present invention.

Figure 2:
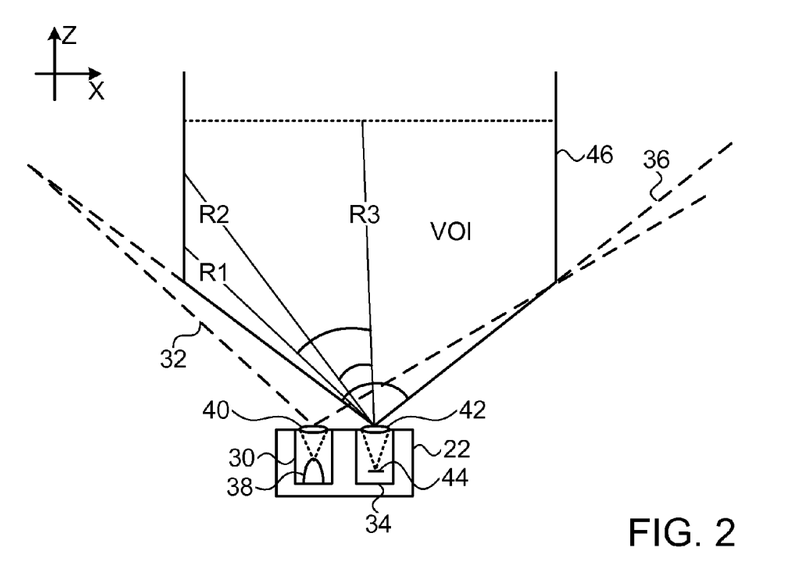
FIG. 2 is a schematic top view of a 3D imaging assembly and its volume of interest, in accordance with an embodiment of the present invention.

FIG. 2 is a schematic top view of imaging assembly and its volume of interest (VOI) 46, in accordance with an embodiment of the present invention. Imaging assembly 22 comprises an illumination module 30, which projects a pattern over a projection field 32, which contains effectively all of VOI 46. The illumination module in this example comprises a radiation source 38, which generates patterned optical radiation, and projection optics 40, which project the pattern onto objects in VOI 46. The optical radiation may comprise visible, infrared or ultraviolet radiation. Radiation source 38 may comprise, for example, a laser diode or light-emitting diode coupled to transilluminate a suitable, diffuser, microlens array, diffractive optical element, or other transparency, as described in the above-mentioned PCT publications or as otherwise known in the art.

A depth imaging module 34 in assembly 22 captures images of the pattern reflected from the objects in VOI 46. Typically, the imaging module comprises objective optics 42, which focus light from a field of view (FOV) onto an image sensor 44. The image sensor may comprise, for example, a CMOS or CCD sensor, comprising an array of detector elements (not shown) that are sensitive to the optical radiation emitted by illumination module 30. Each of the detector elements outputs a signal corresponding to a pixel in the images of VOI 46.

A processor, such as a microprocessor in assembly 22 (not shown) or in computer 24, receives the images from module 34 and compares the pattern in each image to a reference pattern stored in memory. The processor computes local shifts of parts of the pattern in the images captured by module 34 relative to the reference pattern and translates these shifts into depth coordinates. Details of this process are described, for example, in PCT International Publication WO 2010/004542, whose disclosure is incorporated herein by reference. Alternatively, as noted earlier, assembly 22 may be configured to generate depth maps by other means that are known in the art, such as stereoscopic imaging or time-of-flight measurements.

Comparing FIGS. 1 and 2, it can be seen that VOI 46 in this and various other sorts of 3D user interface applications has a pentagonal profile when projected onto the X-Z plane, with image capture module 34 at its vertex. Although VOI 46 is congruent with FOV 36 in the near field, at greater depths the VOI is limited by the walls of the room or other space in which system 20 is deployed. The distance to the back wall in this example is marked in FIG. 2 as R3. Alternatively, R3 may be defined as the maximum design range (in terms of the Z-coordinate) of objects to be detected by system 20. Over a certain range of angles within VOI 46, this maximum range is maintained, up to roughly the angle corresponding to R2 (while the radial distance to points at the end of the range may actually increase moving away from the central axis). At larger angles, however, the range becomes smaller, as illustrated by R1, for example. This specific, simplified geometry is shown in FIG. 2 by way of example, but other operating configurations are expected to have similar, roughly pentagonal volumes of interest, although the angles and dimensions may differ.

The characteristic shape and dimensions of VOI 46 may be applied in optimizing the allocation of the resources of imaging assembly 22 over the VOI. Specifically, resources such as the available optical power of radiation source 38 and/or the available resolution of image sensor 44 may be allocated non-uniformly over the VOI. A number of examples of such allocations are described below.

Figure 3:
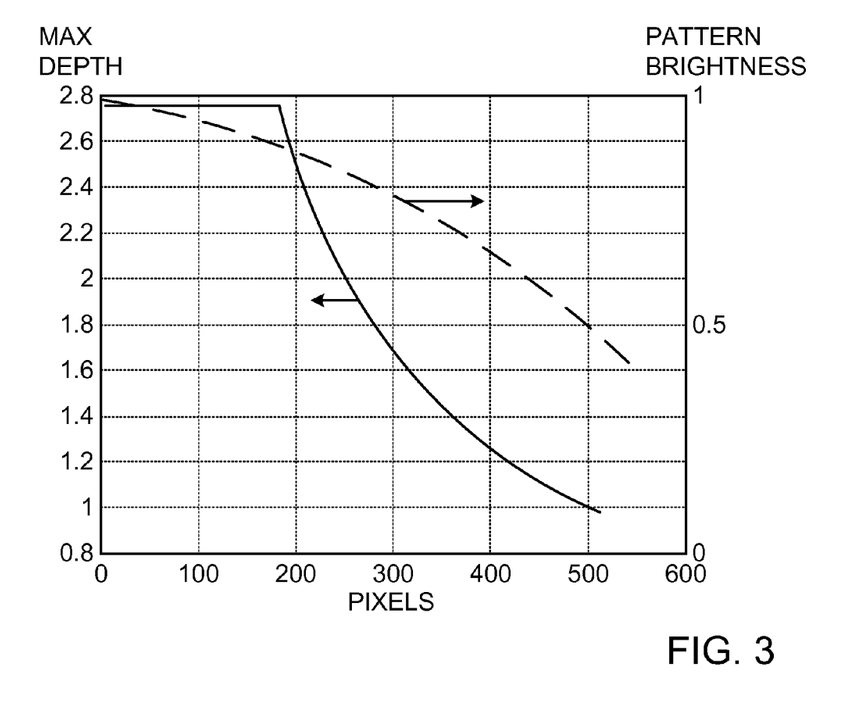
FIG. 3 is a plot that schematically shows depth and pattern brightness as a function of angle in a depth mapping system, in accordance with an embodiment of the present invention.

FIG. 3 is a plot that schematically shows depth and pattern brightness as a function of angle in a depth mapping system, in accordance with an embodiment of the present invention. The angle is expressed in terms of pixels from the center of the field of view of image capture module 34, wherein the image captured by module 34 is roughly 1000 pixels wide, and pixel 0 corresponds to the central pixel in the image. The solid curve in the plot represents the maximal depth as a function of angle within a typical volume of interest, as marked on the left side of the plot. The depth values are normalized to the depth at the angular extremes of the field of view. The dashed curve indicates pattern brightness, normalized to the maximal brightness at the center of the field, as marked on the right side of the plot.

In an active depth mapping system, the brightness of radiation that reaches an object at distance d from illumination module 30 and is then reflected back and received by image capture module 34 drops in proportion to $d^4$. Because the image area captured by each detector element in image sensor 44 grows as $d^2$, however, the optical power received by the detector elements from an object at distance d is inversely proportional to $d^2$. At any given angle, the required illumination intensity of the pattern projected by module 30 to provide a given minimum optical signal level at image sensor 44 is determined by the maximum depth of the volume of interest at that angle, as illustrated by the solid curve in FIG. 3. Thus, less projected intensity is required at high angles, where the maximum depth is smaller.

For this reason, the intensity distribution of illumination module 30 may be modulated so as to concentrate more optical radiation energy in the center of the volume of interest, at low angles, and less at higher angles, as illustrated by the dashed curve in FIG. 3. Although this curve shows only moderate modulation (to 50% of the central value at the edges of the volume), in alternative embodiments the modulation of intensity may be in proportion to the square of the maximum depth as a function of angle, in accordance with the $d^{-2}$ relation described above. The modulation of intensity may be accomplished by suitable design of radiation source 38 and/or by addition of diffractive or refractive optical elements with non-uniform energy distribution characteristics in projection optics 40.

Figure 4:
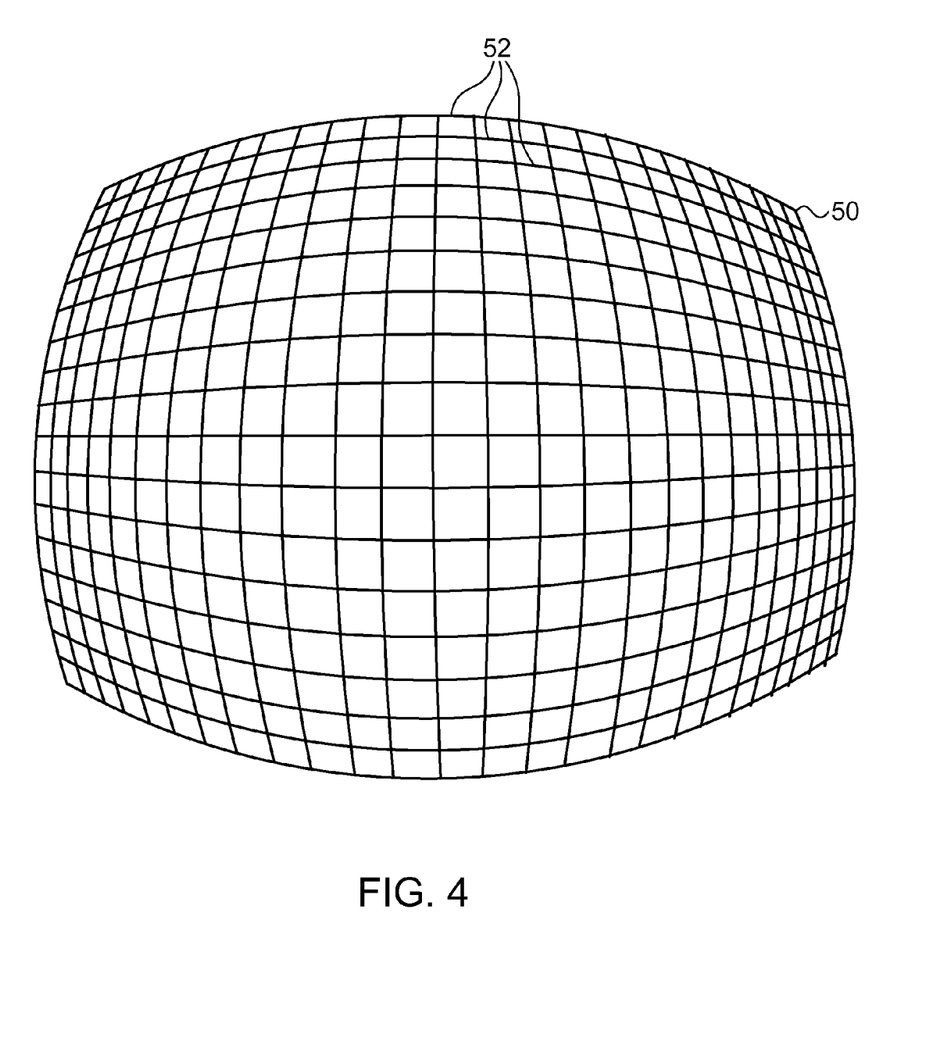
FIG. 4 is a schematic, graphical representation of an image formed by a distorting lens, in accordance with an embodiment of the present invention.

FIG. 4 is a schematic, graphical representation of an image 50 formed by a distorting lens, which may be incorporated in objective optics 42 of image capture module 34, in accordance with another embodiment of the present invention. Each cell 52 in image 50 corresponds to an area of VOI 46 captured by optics 42. Thus, pixels at the center of the field of view of module 34 receive the highest magnification, and the magnification drops with angle with increasing angle. In other words, the image is intentionally distorted, in a manner similar to that provided by fish-eye lenses. This distortion compensates for the smaller apparent sizes of objects appearing at greater distances from image capture module 34. As a result of this intentional distortion, objects of a given physical size in different locations at the outer limits of the volume of interest are imaged onto roughly equal areas of image sensor 44, thus making more effective use of the detection resources of imaging assembly 22.

Although image 50 shows a characteristic fish-eye type of distortion, optics 42 may alternatively be designed, using methods of optical design that are known in the art, to give a distortion that is more precisely tailored to the maximum distance as a function of angle (as shown in FIG. 3, for example). The distortion may be circularly symmetrical, as shown in FIG. 4, or it may alternatively be astigmatic or otherwise non-symmetrical.

The sort of optical distortion that is introduced by objective optics 42 in the embodiment illustrated by FIG. 4 can be useful in compensating for pattern distortion that may be generated by illumination module 30 in some embodiments. Such pattern distortion may arise, for example, when radiation source 38 comprises a coherent emitter, such as a laser diode, which transilluminates a diffractive optical element (DOE) to create a spot pattern. The DOE may comprise multiple diffractive surfaces, either on opposing sides of the same transparent substrate or on two or more substrates (not shown), which are stacked to create a compound DOE. DOEs of this sort are described, for example, in U.S. Patent Application Publications 2009/0185274 and 2010/0284082, whose disclosures are incorporated herein by reference.

In some of the embodiments that are described in these publications, a compound DOE comprises one DOE that applies a pattern to the input beam and another DOE that splits the input beam into a matrix of output beams so as to tile a region in space with multiple adjacent instances of the pattern. Such DOEs typically create pincushion distortion in the projected pattern, due to the fact that the diffraction orders are evenly spaced in terms of the sine of their diffraction angles, so that the angular distance between the projected orders grows with the order number. Furthermore, give the form of VOI 46, it is desirable that illumination module 30 vary the density of the pattern such that the density at a given projection angle is positively correlated with the farthest distance in the VOI at that angle. This criterion for optical resource allocation applies not only to DOE-based projectors, but also to other pattern projectors.

Objective optics 42 in the embodiment of FIG. 4 may be designed to mitigate the problems cause by the projection module, by applying an optical distortion to the image that compensates at least partially for the pattern distortion. For this purpose, optics 42 may comprise an F-theta lens, for example, which images the pattern created by the DOE in such a way that the sizes and angular separation of the spots in the images cast by the optics onto image sensor 44 remain approximately constant over the X-Y plane. The barrel distortion of the F-theta lens may be optimized to balance the pattern distortion that is caused by the DOE in illumination module 30. The properties of the F-theta lens in module thus lead to enhanced depth accuracy and better transverse resolution in the center of VOI 46, at the possible expense of the high-angle, shorter-distance edge of the VOI.

Although the above embodiments present a number of specific ways in which the shape of the volume of interest can be used in enhancing the design and operation of system 20, other techniques for non-uniform resource allocation based on the shape of the volume of interest will be apparent to persons of skill in the art after reading the above description and are considered to be within the scope of the present invention. For example, pattern-based depth mapping systems sometimes suffer from problems of "phase wrapping," as pattern shifts repeat themselves periodically with increasing depth, and computational resources must be invested in "unwrapping" the phase in order to disambiguate depth values. The known maximal depth of the volume of interest as a function of angle can be used to eliminate depth values that are out of range and thus simplify the task of disambiguation.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for depth mapping, comprising:
providing depth mapping resources comprising:
an illumination module, which is configured to project patterned optical radiation into a volume of interest containing an object; and
an image capture module, which is configured to capture an image of the pattern reflected from the object, wherein the volume of interest has a depth that varies with angle relative to the illumination and image capture modules; and
generating a depth map of the object using the resources while applying at least one of the resources with an optical resolution that varies non-uniformly over the volume of interest, so as to intentionally distort the image responsively to the varying depth as a function of the angle.

2. The method according to claim 1, wherein the volume of interest has a pentagonal profile, with a vertex at the image capture module.

3. The method according to claim 1, wherein varying the application of the at least one of the resources non-uniformly comprises angularly modulating an intensity distribution of the patterned optical radiation projected by the illumination module.

4. The method according to claim 1, wherein varying the application of the at least one of the resources non-uniformly comprises optically distorting the image captured by the image capture module.

5. The method according to claim 1, wherein the illumination module is configured to project a spatial pattern of the optical radiation onto the object, and wherein generating the depth map comprises deriving depth coordinates of the object based on transverse shifts of the spatial pattern in the image.

6. A method for depth mapping, comprising:
providing depth mapping resources comprising:
an illumination module, which is configured to project patterned optical radiation into a volume of interest containing an object, wherein the illumination module generates the patterned optical radiation with a given pattern distortion; and
an image capture module, which is configured to capture an image of the pattern reflected from the object, wherein the image capture module comprises objective optics configured to form an image of the pattern on an image sensor while applying an optical distortion to the image that compensates at least partially for the pattern distortion; and
generating a depth map of the object using the resources.

7. The method according to claim 6, wherein the objective optics comprise an F-theta lens.

8. The method according to claim 6, wherein the illumination module comprises a diffractive optical element (DOE) and a radiation emitter configured to transilluminate the DOE so as to generate the patterned optical radiation.

9. Apparatus for depth mapping, comprising:
depth mapping resources comprising:
an illumination module, which is configured to project patterned optical radiation into a volume of interest containing an object; and
an image capture module, which is configured to capture an image of the pattern reflected from the object, wherein the volume of interest has a depth that varies with angle relative to the illumination and image capture modules, and
wherein at least one of the resources is applied with an optical resolution that varies non-uniformly over the volume of interest so as to intentionally distort the image, responsively to the varying depth as a function of the angle; and
a processor, which is configured to process the image in order to generate a depth map of the object.

10. The apparatus according to claim 9, wherein the volume of interest has a pentagonal profile, with a vertex at the image capture module.

11. The apparatus according to claim 10, wherein an intensity distribution of the patterned optical radiation projected by the illumination module is angularly modulated.

12. The apparatus according to claim 11, wherein the image capture module comprises optics configured to optically distort the image captured by the image capture module.

13. The apparatus according to claim 9, wherein the illumination module is configured to project a spatial pattern of the optical radiation onto the object, and wherein the processor is configured to derive depth coordinates of the object based on transverse shifts of the spatial pattern in the image.

14. The apparatus according to claim 9, wherein the illumination module generates the patterned optical radiation with a given pattern distortion, and wherein the image capture module comprises objective optics configured to form an image of the pattern on an image sensor while applying an optical distortion to the image that compensates at least partially for the pattern distortion.

15. The apparatus according to claim 14, wherein the objective optics comprise an F-theta lens.

16. The apparatus according to claim 14, wherein the illumination module comprises a diffractive optical element (DOE) and a radiation emitter configured to transilluminate the DOE so as to generate the patterned optical radiation.

17. Apparatus for depth mapping, comprising:
an illumination module, which is configured to project patterned optical radiation, with a given pattern distortion, into a volume of interest containing an object; and
an image capture module, which comprises an image sensor and objective optics configured to form an image of the pattern on an image sensor while applying an optical distortion to the image that compensates at least partially for the pattern distortion; and
a processor, which is configured to process the image in order to generate a depth map of the object.

18. The apparatus according to claim 17, wherein the objective optics comprise an F-theta lens.

19. The apparatus according to claim 17, wherein the illumination module comprises a diffractive optical element (DOE) and a radiation emitter configured to transilluminate the DOE so as to generate the patterned optical radiation.

20. The method according to claim 1, wherein applying the at least one of the resources with an optical resolution that varies non-uniformly over the volume of interest compensates for smaller apparent sizes of objects appearing at greater distances from the image capture module.

21. The method according to claim 4, wherein the image capture module comprises an image sensor, and wherein optically distorting the image causes objects of a given physical size in different locations at outer limits of the volume of interest to be imaged onto equal areas of the image sensor.

* * * * *